United States Patent
Wakabayashi et al.

(10) Patent No.: US 12,155,216 B2
(45) Date of Patent: Nov. 26, 2024

(54) DC GRID SYSTEM, CONTROL DEVICE, AND CONTROL METHOD

(71) Applicant: HITACHI, LTD., Tokyo (JP)

(72) Inventors: Ryo Wakabayashi, Tokyo (JP); Toru Kouno, Tokyo (JP); Satoru Akiyama, Tokyo (JP); Emha Bayu Miftahullatif, Tokyo (JP); Katsutoshi Kondo, Tokyo (JP)

(73) Assignee: HITACHI, LTD., Tokyo (JP)

( * ) Notice: Subject to any disclaimer, the term of this patent is extended or adjusted under 35 U.S.C. 154(b) by 75 days.

(21) Appl. No.: 18/031,361

(22) PCT Filed: Oct. 6, 2021

(86) PCT No.: PCT/JP2021/037043
§ 371 (c)(1),
(2) Date: Apr. 12, 2023

(87) PCT Pub. No.: WO2022/097413
PCT Pub. Date: May 12, 2022

(65) Prior Publication Data
US 2023/0378759 A1    Nov. 23, 2023

(30) Foreign Application Priority Data

Nov. 5, 2020  (JP) ................................. 2020-185236

(51) Int. Cl.
*H02J 3/38*    (2006.01)
*H02J 3/32*    (2006.01)

(52) U.S. Cl.
CPC ................ *H02J 3/381* (2013.01); *H02J 3/32* (2013.01); *H02J 2300/24* (2020.01)

(58) Field of Classification Search
CPC .......... H02J 3/381; H02J 3/32; H02J 2300/24
See application file for complete search history.

(56) References Cited

U.S. PATENT DOCUMENTS

| | | | |
|---|---|---|---|
| 2018/0233914 A1* | 8/2018 | Miki | H02J 3/32 |
| 2019/0326752 A1* | 10/2019 | Kikuchi | H02J 3/38 |
| 2021/0098991 A1* | 4/2021 | Nishimura | H02J 9/061 |

FOREIGN PATENT DOCUMENTS

| | | |
|---|---|---|
| EP | 3823152 A1 | 5/2021 |
| JP | 2009148119 A | 7/2009 |
| JP | 2020014370 A | 1/2020 |
| WO | 2017026287 A1 | 2/2017 |
| WO | 2017163960 A1 | 9/2017 |

OTHER PUBLICATIONS

International Search Report of PCT/JP2021/037043 dated Dec. 28, 2021.

* cited by examiner

*Primary Examiner* — Jared Fureman
*Assistant Examiner* — Duc M Pham
(74) *Attorney, Agent, or Firm* — MATTINGLY & MALUR, PC (57) ABSTRACT

An object of the invention is to provide a control technique capable of connecting a storage battery to a DC bus via a DC/DC converter and controlling charging and discharging of the storage battery by the DC/DC converter. A DC grid system according to the invention calculates a voltage command value of a DC bus using a present voltage of a storage battery and a target voltage of the storage battery, and provides the voltage command value as a command value for each of an AC/DC converter and a DC/DC converter (see FIG. 1).

9 Claims, 8 Drawing Sheets

DC GRID SYSTEM, CONTROL DEVICE, AND CONTROL METHOD

TECHNICAL FIELD

The present invention relates to a DC grid system in which a storage battery is connected to a DC bus.

BACKGROUND ART

In recent years, formation of a resilient power network is strongly recommended. A DC grid system having an autonomous function is advantageous in terms of a demand response (controlling a power on a demand side) and a resilience (being strong against a disaster and the like).

In the DC grid system, an alternating current voltage input from an alternating current power system is subjected to an alternating current/direct current conversion, a distributed power supply device (a solar cell, a fuel cell, a storage battery, or the like) is subjected to a direct current/direct current conversion, and a load is subjected to an alternating current/direct current conversion. The alternating current power system, the distributed power supply device, and the load are connected to each other via a DC bus. In the DC grid system, it is necessary to control charging and discharging of the storage battery in order to perform the demand response and to stably supply a power to the load connected to the DC bus.

PTL 1 below describes controlling charging and discharging of a storage battery connected to a DC bus. PTL 1 describes a control device that transmits a current command to a converter connected to a battery, and issues, based on the current command, a compensation pulse width modulation (PWM) command to a step-up and down converter such that a voltage of the DC bus becomes constant, thereby maintaining the DC bus within a certain range and causing the storage battery to output a current with good responsiveness.

CITATION LIST

Patent Literature

PTL 1: JP2009-148119A

SUMMARY OF INVENTION

Technical Problem

In a DC bus system in the related art as described in PTL 1, device control is generally performed by controlling a DC bus current after stabilizing a DC bus voltage within a predetermined range. It can also be said that, in PTL 1, the device control is performed by controlling the converter by using the current command.

When the storage battery and a power distribution system are connected to each other using the DC bus, an AC/DC converter is connected between the power distribution system and the DC bus, and a DC/DC converter is connected between the storage battery and the DC bus. Devices connected to the DC bus, such as such converters, are not necessarily provided by the same business operator, and devices provided by various business operators may be connected to the DC bus. Therefore, when providing a command value to each of the devices, it is necessary to use a command value generally used to control such devices. This is because it is not desirable to customize the device provided by each of the business operators in terms of cost effectiveness.

When the storage battery is connected to the DC bus, the charging and discharging of the storage battery is controlled by the DC/DC converter. Since a command value for the DC/DC converter is usually provided by using a voltage command value, the charging and discharging of the storage battery needs to be controlled by using the voltage command value. However, the device control in the DC bus system is usually performed by using a DC current command value in the related art as in PTL 1. Accordingly, a DC bus control method using a current command in the related art as in PTL 1 cannot be used when the storage battery is controlled by a general DC/DC converter.

The invention is made in view of the above problems, and an object thereof is to provide a control technique capable of connecting a storage battery to a DC bus via a DC/DC converter and controlling charging and discharging of the storage battery by the DC/DC converter.

Solution to Problem

A DC grid system according to the invention calculates a voltage command value of a DC bus by using a present voltage of a storage battery and a target voltage of the storage battery, and provides the voltage command value as a command value for each of an AC/DC converter and a DC/DC converter.

Advantageous Effects of Invention

According to the DC grid system of the invention, a voltage command value for a voltage converter can be determined by using a present voltage of a storage battery and a target voltage of the storage battery. Accordingly, the charging and discharging of the storage battery connected to a DC bus can be controlled by using the voltage command value.

DESCRIPTION OF EMBODIMENTS

Embodiment 1

Figure 1:
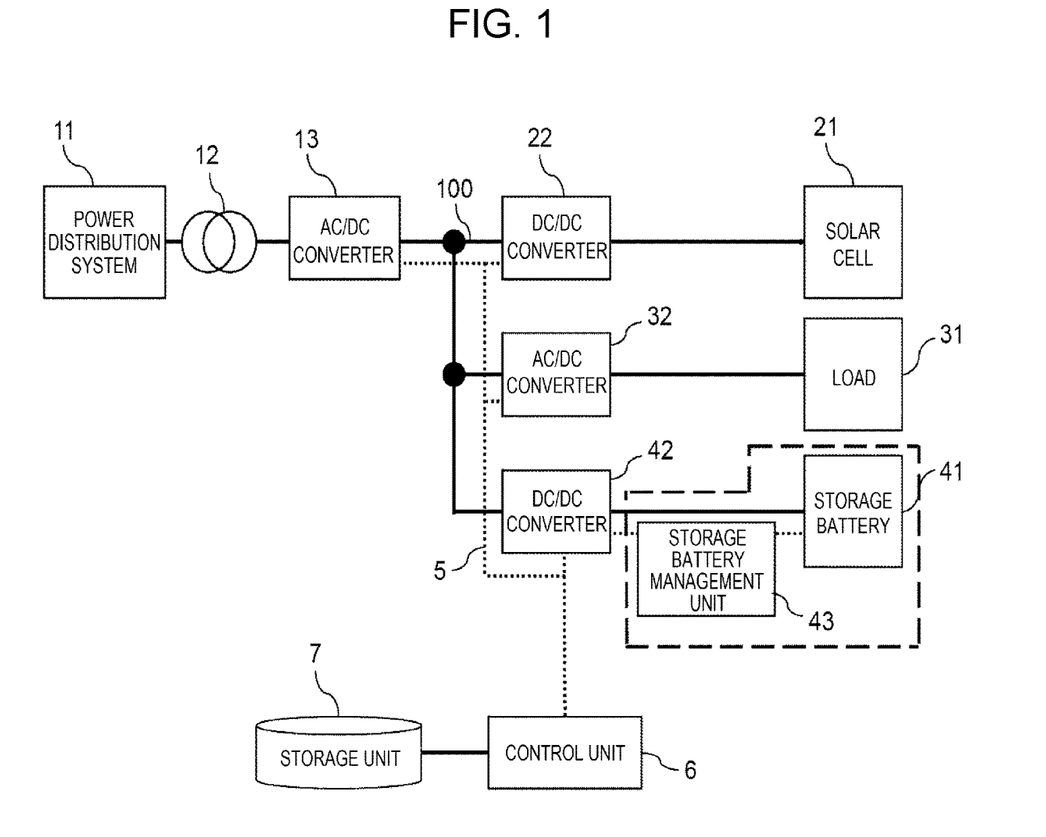
FIG. 1 is a diagram showing a configuration example of a DC grid system according to Embodiment 1.

FIG. 1 is a diagram showing a configuration example of a DC grid system according to Embodiment 1 of the invention. A power distribution system 11 is connected to a DC bus 100 via a transformer 12 and an AC/DC converter 13. A solar cell 21 is connected to the DC bus 100 via a DC/DC converter 22. A load 31 is connected to the DC bus 100 via an AC/DC converter 32. A storage battery 41 is connected to the DC bus 100 via a DC/DC converter 42.

A storage battery management unit 43 acquires a state of the storage battery 41 and transmits the acquired state to the DC/DC converter 42 and a control unit 6 via a communication line 5. The storage battery management unit 43 can acquire, for example, a state such as a state of charge, a voltage, and a temperature of the storage battery 41. The storage battery management unit 43 may be a part of components of the storage battery 41. The storage battery management unit 43 may acquire the above information from the storage battery 41 via a network.

The control unit 6 acquires voltage information from the DC/DC converter 42 via the communication line 5. The control unit 6 transmits a voltage command value to each of the AC/DC converter 13, the DC/DC converter 22, the AC/DC converter 32, and the DC/DC converter 42 via the communication line 5. Charging and discharging of the storage battery 41 is controlled by transmitting the voltage command value from the control unit 6 to the DC/DC converter 42. A storage unit 7 stores data to be used by the control unit 6.

The DC/DC converter 42 controls, based on a PWM signal, a voltage ratio (conduction ratio) between a voltage of the storage battery and a voltage of the DC bus 100.

Embodiment 1: Procedure of Determining Voltage Command Value

In the DC/DC converter 42, a relation between a present voltage $V_{bat}$ of the storage battery 41 and a present voltage $V_{bus}$ of the DC bus 100 is expressed by the following Equation (1) using a conduction ratio $\alpha$.

[Equation 1]
$$\frac{(V_{bus} - V_{bat})}{V_{bus}} = \alpha \quad (1)$$

When a voltage of the storage battery 41 reaches a target voltage $V_{SOC}$ of the storage battery 41, it is assumed that a voltage of the DC bus 100 reaches a target voltage $V_{bus}^*$. In this case, a relation between the target voltage $V_{SOC}$ of the storage battery 41 and the target voltage $V_{bus}^*$ of the DC bus 100 is expressed by the following Equation (2). A conduction ratio $\alpha^*$ is a conduction ratio when the voltage of the storage battery 41 is $V_{SOC}$ and the voltage of the DC bus 100 is $V_{bus}^*$.

[Equation 2]
$$\frac{(V_{bus}^* - V_{SOC})}{V_{bus}^*} = \alpha^* \quad (2)$$

A relation among the present voltage $V_{bat}$ of the storage battery 41, the present voltage $V_{bus}$ of the DC bus 100, the target voltage $V_{bus}^*$ of the DC bus 100, and the target voltage $V_{SOC}$ of the storage battery 41 is expressed by the following Equation (3) based on Equations (1) and (2).

[Equation 3]
$$V_{bus}^* = \frac{V_{SOC}}{\left\{1 - c \cdot \left(1 - \frac{V_{bat}}{V_{bus}}\right)\right\}} \quad (3)$$

A change rate c is a ratio between the conduction ratio $\alpha$ and the conduction ratio $\alpha^*$, and is expressed by the following Equation (4).

[Equation 4]
$$c = \frac{\alpha^*}{\alpha} \quad (4)$$

Figure 2:
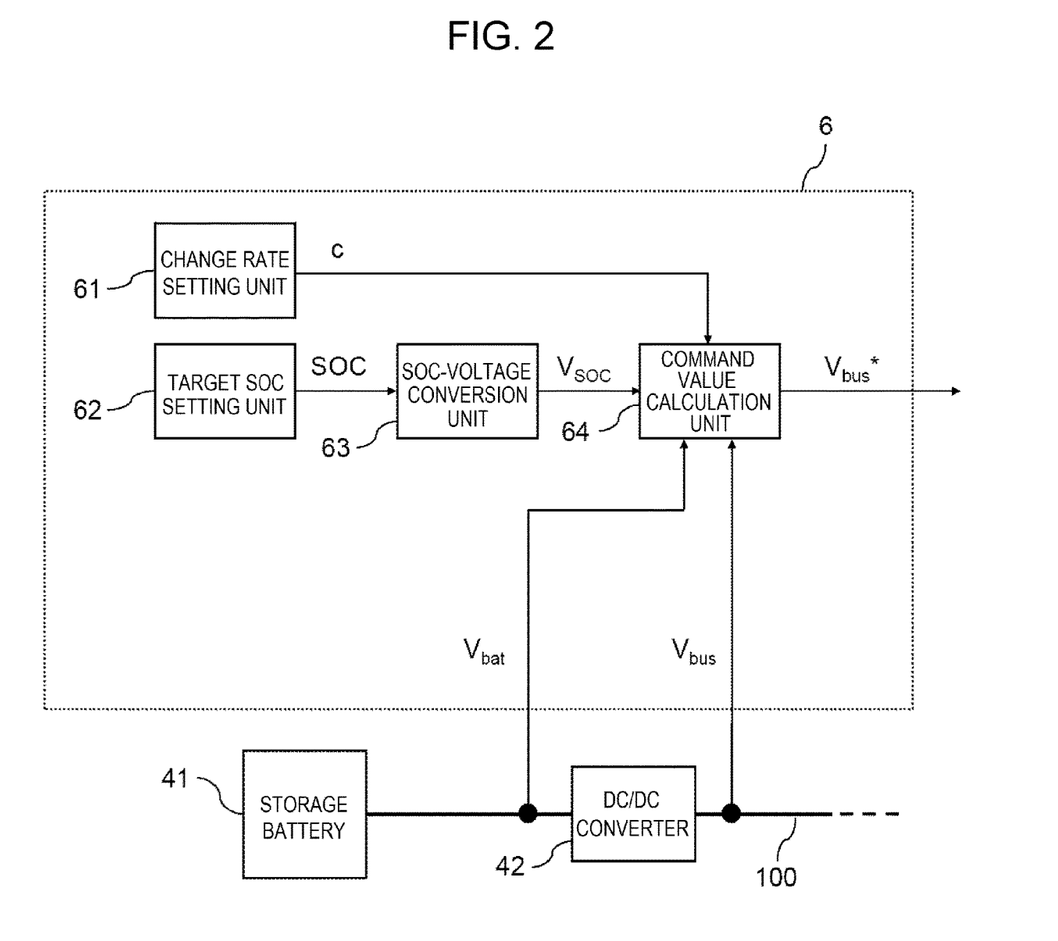
FIG. 2 is a block diagram of a control unit 6.

FIG. 2 is a block diagram of the control unit 6. The control unit 6 includes a change rate setting unit 61, a target SOC setting unit 62, a SOC-voltage conversion unit 63, and a command value calculation unit 64.

The change rate setting unit 61 sets the change rate c. The set change rate c is input to the command value calculation unit 64. The change rate c has a function of preventing a DC bus current from abruptly changing before and after the charging and discharging of the storage battery 41. For example, a user can provide a desired value of the change rate c to the control unit 6 via an appropriate interface. The change rate setting unit 61 uses the value specified by the user as a set value.

The target SOC setting unit 62 sets a target state of charge SOC of the storage battery 41. For example, the user can provide a value of the target state of charge SOC to the control unit 6 via an interface in the same manner as the change rate c. The target SOC setting unit 62 uses the value specified by the user as a set value.

The SOC-voltage conversion unit 63 determines the target voltage $V_{SOC}$ of the storage battery 41 based on the target state of charge SOC. For example, a SOC-$V_{SOC}$ table to be described later is stored in advance in the storage unit 7, and the target state of charge SOC can be converted into the target voltage $V_{SOC}$ by referring to the SOC-$V_{SOC}$ table. The determined $V_{SOC}$ is input to the command value calculation unit 64. The $V_{SOC}$ may be determined by another appropriate method.

The command value calculation unit 64 determines the target voltage $V_{bus}^*$ of the DC bus 100 based on Equation (3) using the present voltage $V_{bus}$ of the DC bus 100, the present voltage $V_{bat}$ of the storage battery 41, the target voltage $V_{SOC}$ of the storage battery 41, and the change rate c. The determined target voltage $V_{bus}^*$ of the DC bus 100 is input to each of the AC/DC converter 13, the DC/DC converter 22, the AC/DC converter 32, and the DC/DC converter 42.

Figure 3:
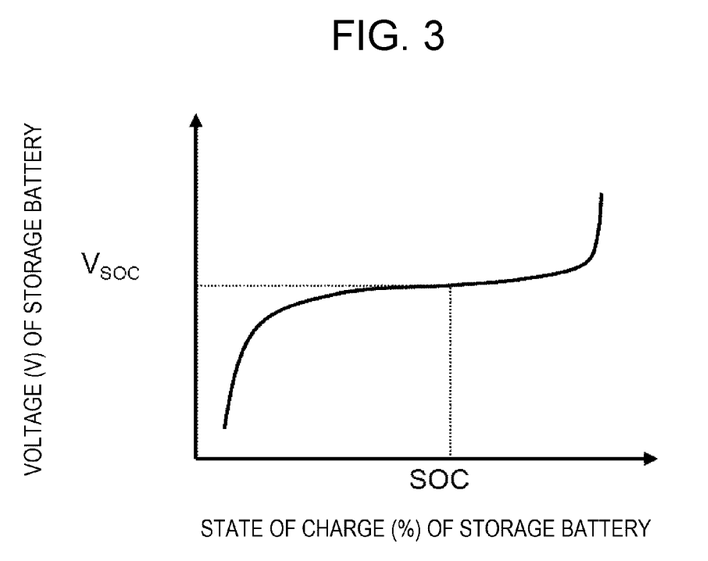
FIG. 3 is an example of a SOC-$V_{SOC}$ table.

FIG. 3 is an example of the SOC-$V_{SOC}$ table. As shown in FIG. 3, a relation between a state of charge of the storage battery 41 and an output voltage of the storage battery 41 is measured in advance, and a result is recorded as data and stored in the storage unit 7. Any data format can be used such as a data table in which a value of each point in a graph as shown in FIG. 3 is recorded and a calculation equation in which the graph is expressed by a function. The SOC-voltage conversion unit 63 determines the target voltage $V_{SOC}$ from the target state of charge SOC based on the data.

Figure 4:
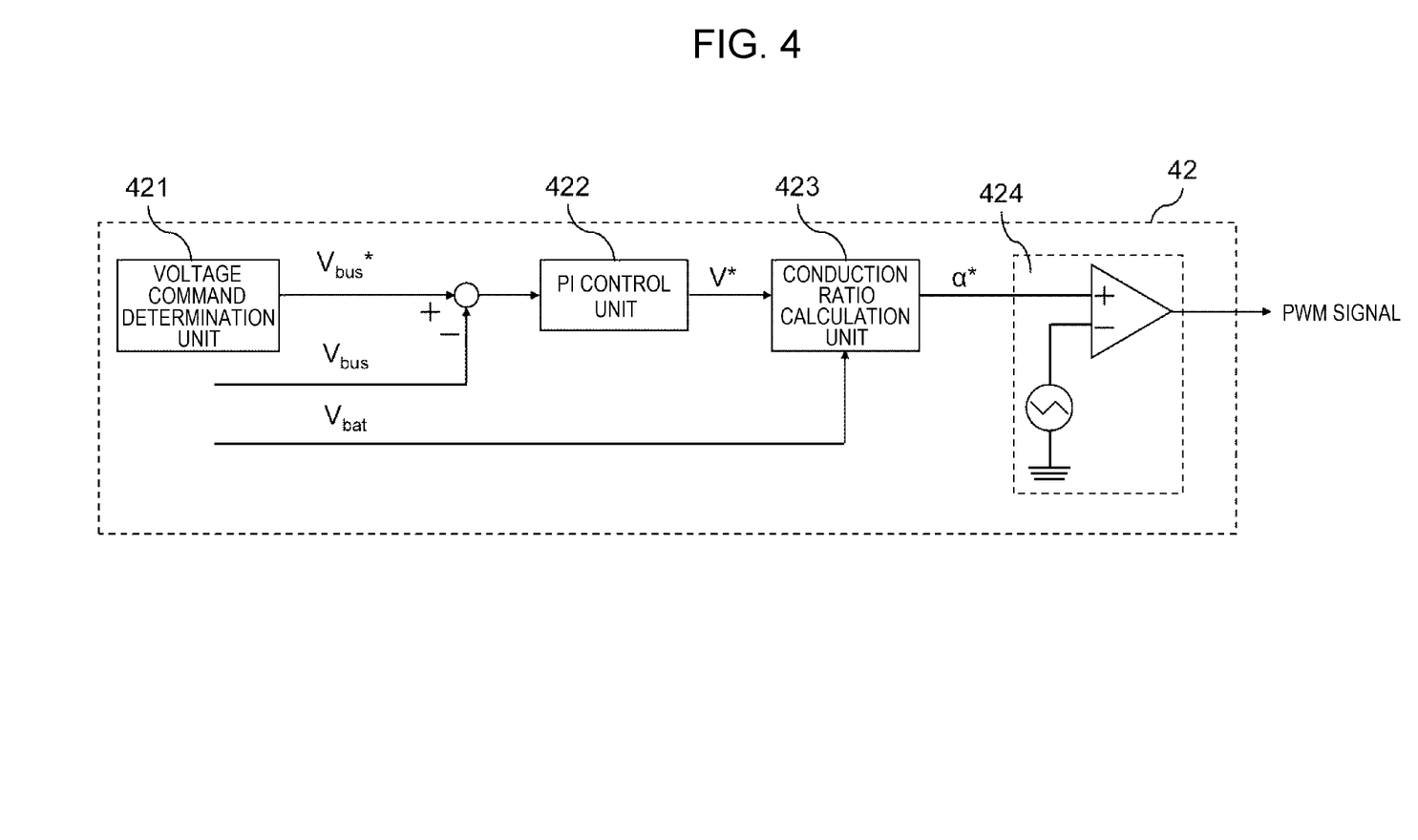
FIG. 4 is a block diagram of a DC/DC converter 42.

FIG. 4 is a block diagram of the DC/DC converter 42. A voltage command determination unit 421 outputs, as a control command, the target voltage $V_{bus}^*$ of the DC bus 100 received from the control unit 6. A PI control unit 422 outputs a voltage command value V* by PI control based on a difference between the target voltage $V_{bus}$* transmitted from the voltage command determination unit 421 and the present voltage $V_{bus}$ of the DC bus 100. A conduction ratio calculation unit 423 calculates the conduction ratio $\alpha$* based on the voltage command value V* and the present voltage $V_{bat}$ of the storage battery 41. A comparator 424 generates a PWM signal based on the conduction ratio $\alpha$*. The voltage ratio between the voltage of the storage battery 41 and the voltage of the DC bus 100 is controlled based on the PWM signal.

Figure 5:
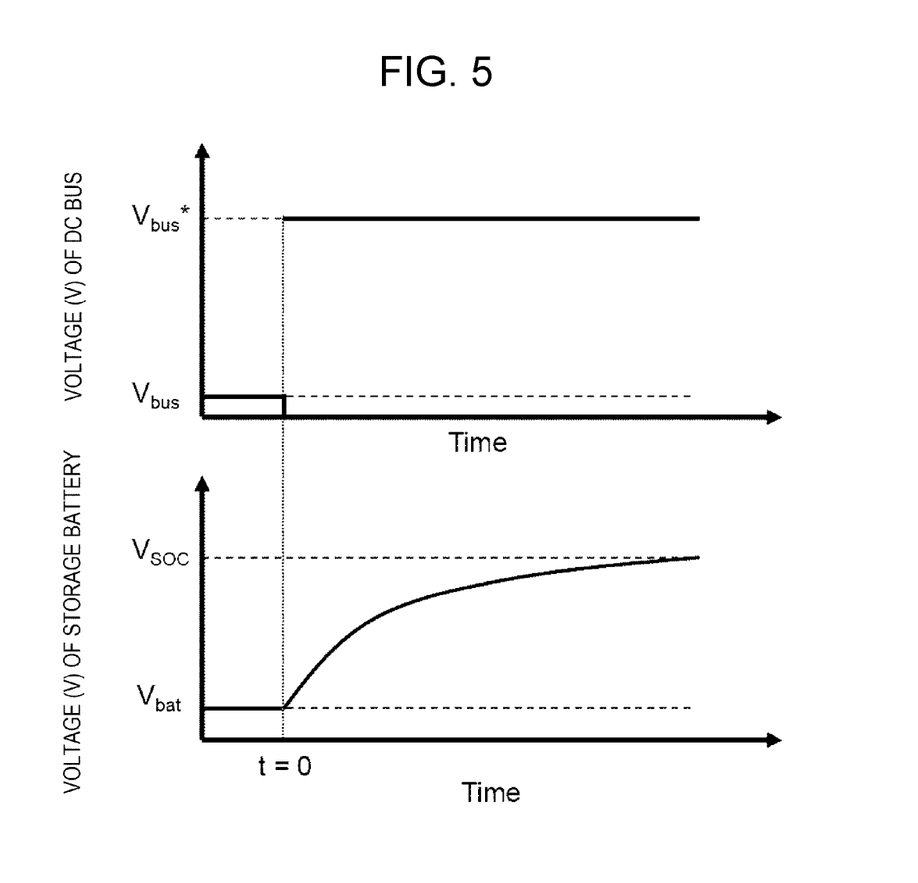
FIG. 5 shows an example of a waveform relating to a voltage of a storage battery 41 and a waveform relating to a voltage of a DC bus 100.

FIG. 5 shows an example of a waveform relating to the voltage of the storage battery 41 and a waveform relating to the voltage of the DC bus 100. An operation of the DC grid system will be described below mainly with reference to FIG. 5. The operation described below is merely an example, and the operation is not necessarily limited to the operation described below. Each device may operate as described above.

When the target state of charge SOC of the storage battery 41 is set (t=0), the target voltage $V_{SOC}$ of the storage battery 41 is set based on the graph in FIG. 3. Then, the target voltage $V_{bus}$* of the DC bus 100 is determined based on the block diagram shown in FIG. 2. The target voltage $V_{bus}$* of the DC bus 100 is input as a voltage command value to each of the AC/DC converter 13, the DC/DC converter 22, the AC/DC converter 32, and the DC/DC converter 42. When the target voltage $V_{bus}$* of the DC bus 100 is input, the DC/DC converter 42 generates the PWM signal based on the block diagram shown in FIG. 4, and controls the voltage ratio between the voltage of the storage battery 41 and the voltage of the DC bus 100. Accordingly, the voltage of the DC bus 100 is controlled to the target voltage $V_{bus}$*, and the voltage of the storage battery 41 is controlled to the target voltage $V_{SOC}$.

Embodiment 1: Conclusion

The DC grid system according to Embodiment 1 determines the target voltage $V_{bus}$* of the DC bus 100 based on the present voltage $V_{bat}$ of the storage battery 41, the target voltage $V_{SOC}$ of the storage battery 41, and the voltage $V_{bus}$ of the DC bus 100. Accordingly, the charging and discharging of the storage battery 41 connected to the DC bus 100 can be controlled by using the voltage command value for controlling the DC bus 100. In other words, the charging and discharging of the storage battery 41 can be controlled by using a voltage command while connecting the DC bus 100 to the storage battery 41 without using a method of controlling the DC bus current while maintaining the voltage of the DC bus 100 constant as in the related art.

Embodiment 2

In Embodiment 2 of the invention, a charging and discharging speed of the storage battery 41 is controlled by setting a constraint condition for the change rate c. A configuration of a DC grid system is the same as that in Embodiment 1, and thus a difference regarding the constraint condition for the change rate c will be mainly described below.

In Embodiment 2, a constraint condition expressed by the following Equation (5) is imposed on the change rate c. $c_{lim}$ is an upper limit value of the change rate. $c_{lim}$ may be set in advance or may be determined based on measurement data of the change rate c or an equation. The user may provide a value of $c_{lim}$ to the control unit 6. Equation (5) is an example of the constraint condition, and the constraint condition may be created by using a function or an inequality different from Equation (5).

[Equation 5]

$$c \leq c_{lim} \quad (5)$$

When the present voltage $V_{bus}$ of the DC bus 100, the present voltage $V_{bat}$ of the storage battery 41, the target voltage $V_{SOC}$ of the storage battery 41, and the change rate c are input, the command value calculation unit 64 determines a value of c based on the following Equation (6) when the change rate c input from the change rate setting unit 61 does not satisfy the constraint condition expressed by Equation (5). Equation (6) is an example of a determination method for c, and the value of c may be determined by using a function different from Equation (6).

[Equation 6]

$$c = c_{lim} \quad (6)$$

The command value calculation unit 64 recalculates the target voltage $V_{bus}$* of the DC bus 100 at predetermined time intervals. That is, when a predetermined time elapses after the target voltage $V_{bus}$* of the DC bus 100 is determined, the command value calculation unit 64 reacquires the present voltage $V_{bus}$ of the DC bus 100 and the present voltage $V_{bat}$ of the storage battery 41, and recalculates the target voltage $V_{bus}$* of the DC bus 100 based on Equation (3). The recalculated target voltage $V_{bus}$* of the DC bus 100 is input again to the DC/DC converter 42.

Figure 6:
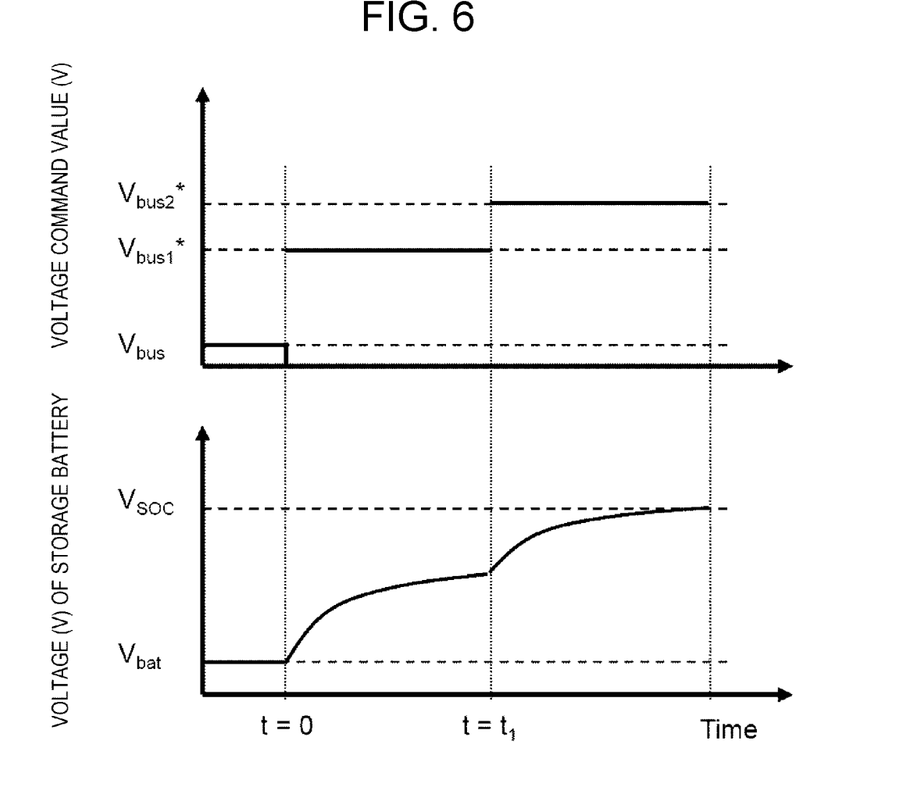
FIG. 6 shows an example of a waveform relating to a voltage of the storage battery 41 and a waveform relating to a voltage of the DC bus 100 according to Embodiment 2.

FIG. 6 shows an example of a waveform relating to a voltage of the storage battery 41 and a waveform relating to a voltage of the DC bus 100 according to Embodiment 2. An operation of the DC grid system will be described mainly with reference to FIG. 6. The operation described below is merely an example, and the operation is not necessarily limited to the operation described below. Each device may operate as described above.

When the target state of charge SOC of the storage battery 41 is set (t=0), the target voltage $V_{SOC}$ of the storage battery 41 is set based on the graph in FIG. 3. The change rate c is determined based on Equations (5) and (6). A target voltage $V_{bus1}$* of the DC bus 100 is determined based on the block diagram shown in FIG. 6. The target voltage $V_{bus1}$* of the DC bus 100 is input as a voltage command value to each of the AC/DC converter 13, the DC/DC converter 22, the AC/DC converter 32, and the DC/DC converter 42. When the target voltage $V_{bus1}$* of the DC bus 100 is input, the DC/DC converter 42 generates a PWM signal based on the block diagram shown in FIG. 4, and controls a voltage ratio between the voltage of the storage battery 41 and the voltage of the DC bus.

When the predetermined time elapses, the voltage of the storage battery 41 converges (t=$t_1$). The command value calculation unit 64 reads again the present voltage $V_{bat}$ of the storage battery 41 and the voltage $V_{bus}$ of the DC bus 100, and redetermines $V_{bus2}$*. At this time, the change rate c may be reset. The target voltage $V_{bus2}$* of the DC bus 100 is input as a voltage command value again to each of the converters.

Embodiment 2: Conclusion

In the DC grid system according to Embodiment 2, the charging and discharging speed of the storage battery 41 can be controlled by setting the constraint condition (upper limit threshold value) for the change rate c. Accordingly, it is possible to prevent the voltage of the DC bus 100 from abruptly changing along with the charging and discharging of the storage battery 41.

Embodiment 3

In Embodiment 3 of the invention, the target voltage $V_{SOC}$ of the storage battery 41 is determined based on the target state of charge SOC of the storage battery 41 and temperature information $T_{bat}$ of the storage battery 41. When a predetermined time elapses after a control command for the target voltage $V_{bus}$* of the DC bus 100 is issued, the temperature information of the storage battery 41 is reacquired, the target voltage $V_{SOC}$ of the storage battery 41 is redetermined based on the target state of charge SOC of the storage battery 41 and the temperature information of the storage battery 41, and the target voltage of the DC bus 100 is redetermined by using the target voltage $V_{SOC}$. Hereinafter, a difference regarding the temperature information of the storage battery 41 will be mainly described.

Figure 7:
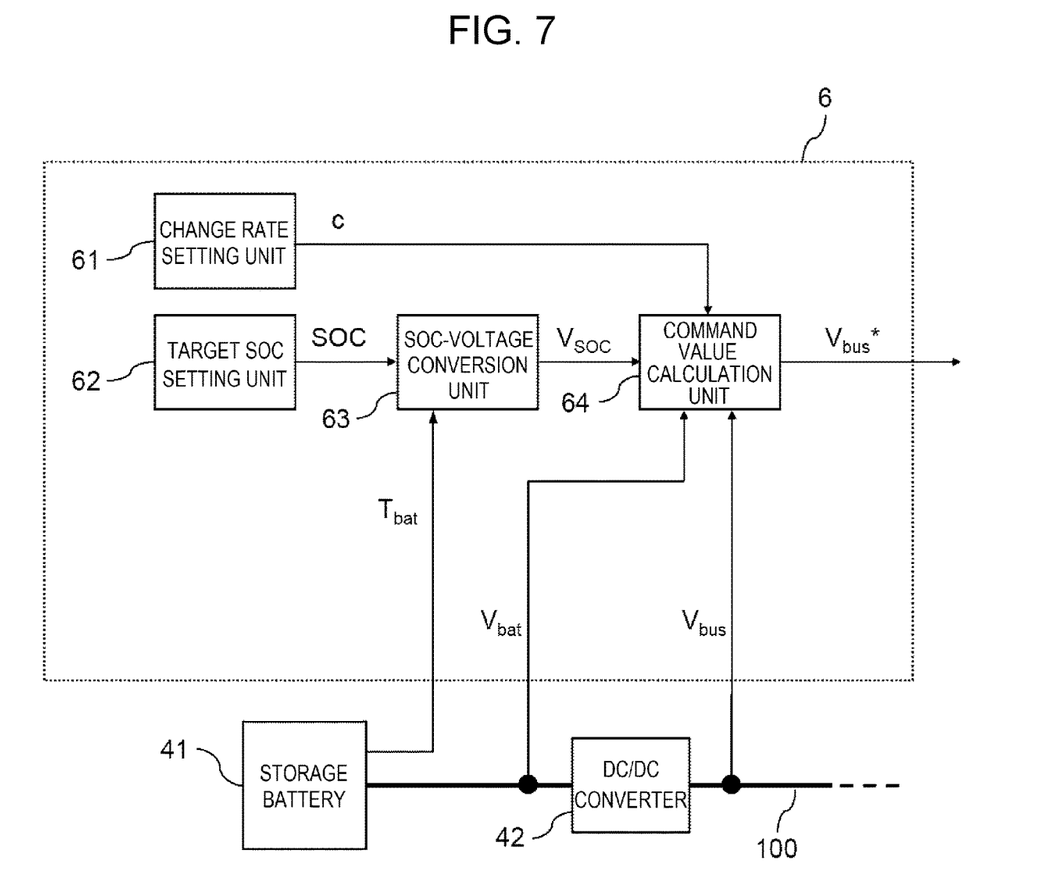
FIG. 7 is a block diagram of the control unit 6 according to Embodiment 3.

FIG. 7 is a block diagram of the control unit 6 according to Embodiment 3. In Embodiment 3, the SOC-voltage conversion unit 63 acquires the temperature information $T_{bat}$ of the storage battery 41 in addition to the target state of charge SOC. The $T_{bat}$ can be acquired from, for example, the storage battery management unit 43. The SOC-voltage conversion unit 63 acquires the $V_{SOC}$ corresponding to the $T_{bat}$ based on a SOC-$V_{SOC}$ table. Other configurations are the same as those in Embodiment 1 and Embodiment 2.

Figure 8:
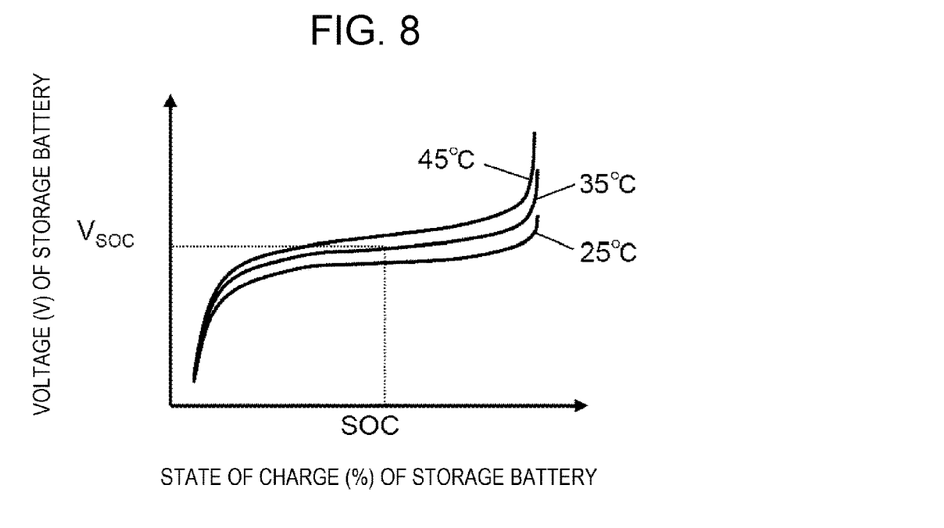
FIG. 8 is an example of a SOC-$V_{SOC}$ table according to Embodiment 3.

FIG. 8 is an example of the SOC-$V_{SOC}$ table according to Embodiment 3. In Embodiment 3, the SOC-$V_{SOC}$ table records a relation between the SOC and the $V_{SOC}$ for each of temperatures of the storage battery 41. The SOC-voltage conversion unit 63 can acquire the $V_{SOC}$ corresponding to the $T_{bat}$. Any data format in FIG. 8 can be used as in FIG. 3.

The SOC-voltage conversion unit 63 reacquires the $T_{bat}$ when the predetermined time elapses after the command value calculation unit 64 outputs the command value $V_{bus}$*. The SOC-voltage conversion unit 63 redetermines the target voltage $V_{SOC}$ by using the reacquired $T_{bat}$ and the target state of charge SOC and referring to the SOC-$V_{SOC}$ table. The command value calculation unit 64 recalculates the command value $V_{bus}$* by using the redetermined $V_{SOC}$.

Figure 9:
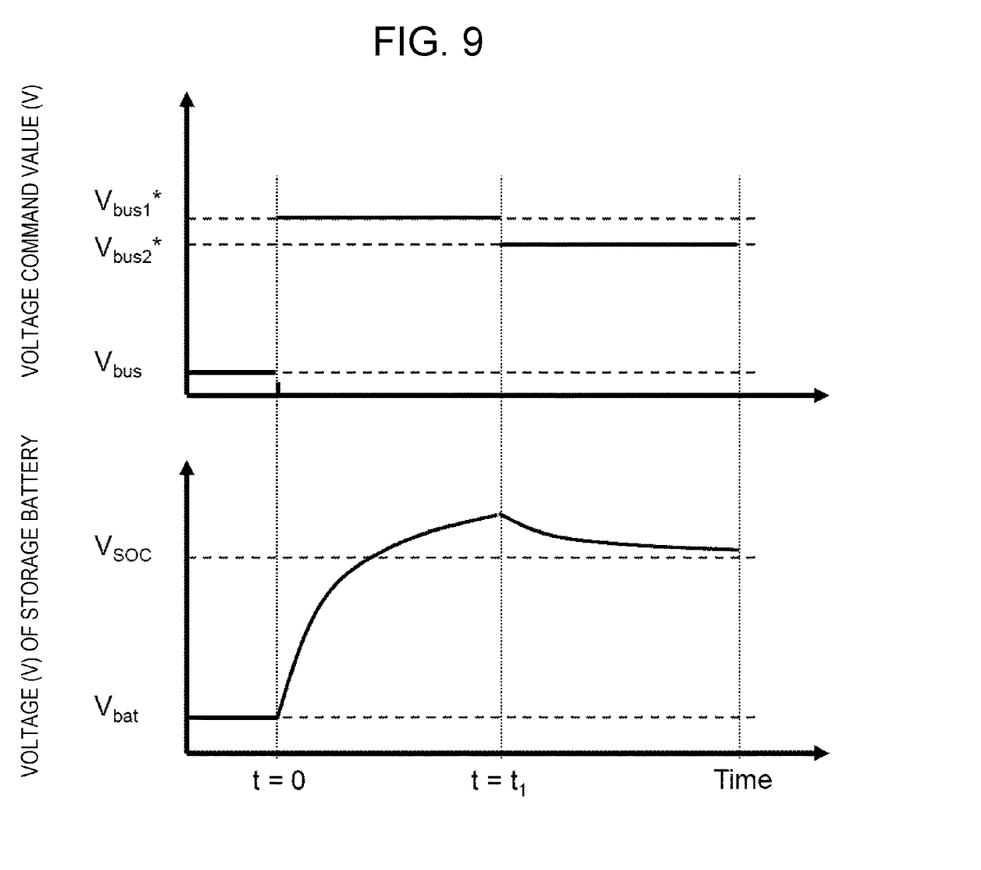
FIG. 9 shows an example of a waveform relating to a voltage of the storage battery 41 and a waveform relating to a voltage of the DC bus 100 according to Embodiment 3.

FIG. 9 shows an example of a waveform relating to a voltage of the storage battery 41 and a waveform relating to a voltage of the DC bus 100 according to Embodiment 3. An operation of the DC grid system will be described mainly with reference to FIG. 9. The operation described below is merely an example, and the operation is not necessarily limited to the operation described below. Each device may operate as described above.

When the target state of charge SOC of the storage battery 41 is set (t=0), the temperature information $T_{bat}$ of the storage battery 41 is acquired, and the target voltage $V_{SOC}$ is set based on the graph in FIG. 8. The command value calculation unit 64 determines the target voltage $V_{bus1}$* of the DC bus 100. The target voltage $V_{bus1}$* is input as a voltage command value to each of the converters. When the target voltage $V_{bus1}$* of the DC bus 100 is input, the DC/DC converter 42 generates a PWM signal, thereby controlling a voltage ratio between the voltage of the storage battery 41 and the voltage of the DC bus 100.

When the predetermined time elapses, the voltage of the storage battery 41 converges (t=t1). The SOC-voltage conversion unit 63 reacquires the temperature information $T_{bat}$, and sets the target voltage $V_{SOC}$ by using the temperature information $T_{bat}$. The command value calculation unit 64 reacquires the present voltage $V_{bat}$ of the storage battery 41 and the voltage $V_{bus2}$ of the DC bus 100, and determines the $V_{bus2}$* by using these values. The target voltage $V_{bus2}$* is input as a voltage command value again to each of the converters.

Embodiment 3: Conclusion

In the DC grid system according to Embodiment 3, the target voltage $V_{SOC}$ of the storage battery 41 can be set based on the temperature information $T_{bat}$ of the storage battery 41 and the target state of charge SOC of the storage battery 41. Accordingly, the target voltage $V_{SOC}$ can be determined with higher accuracy, and the voltage command value $V_{bus}$* can be determined in consideration of a temperature change of the storage battery 41 caused by the charging and discharging. Therefore, the charging and discharging of the storage battery 41 connected to the DC bus 100 can be controlled with higher accuracy.

Modification of the Invention

The invention is not limited to the embodiments described above, and includes various modifications. For example, the above embodiments are described in detail for easy understanding of the invention, and the invention is not necessarily limited to those including all the configurations described above. A part of the configuration of one embodiment may be replaced with the configuration of another embodiment, and the configuration of one embodiment may be added with the configuration of another embodiment. In addition, a part of the configuration of each of the embodiments may be added to, deleted from, or replaced with another configuration.

In the above embodiments, the example in which only one solar cell 21 and one load 31 are connected to the DC bus 100 is shown, but a plurality of solar cells 21 and load 31 may be connected to the DC bus 100. The solar cell 21 and the load 31 may not be connected to each other.

In the above embodiments, the example in which the control unit 6 calculates the voltage command value $V_{bus}$* is described, but the DC/DC converter 42 may calculate the voltage command value $V_{bus}$*. In this case, the DC/DC converter 42 includes the same configuration as that of the control unit 6.

In the above embodiments, the voltage command value $V_{bus}$* for the DC bus 100 may be the same value for respective converters, or may have a fine difference among respective converters. For example, in a case where a control state falls into a deadlock, when the same command value is input to respective converters, the deadlock state cannot be eliminated (at least a long time is required to eliminate the deadlock). In such a case, it may be effective to slightly replace the voltage command value $V_{bus}$* for the DC bus 100 for respective converters. Therefore, in principle, the control unit 6 inputs the same voltage command value $V_{bus}$* to respective converters, but, depending on the control state, may input a voltage command value $V_{bus}$* obtained by adding a slight difference to the once calculated voltage command value $V_{bus}$* to respective converters.

In the above embodiments, the respective functional units provided in the control unit 6 can be implemented by hardware such as a circuit device in which functions of the functional units are implemented, and can be implemented by a calculation device executing software in which the functions of the functional units are implemented. The respective functional units may be implemented by a combination of the hardware and the software.

REFERENCE SIGNS LIST

11: power distribution system
13: AC/DC converter
41: storage battery
42: DC/DC converter
43: storage battery management unit
6: control unit
7: storage unit
100: DC bus

The invention claimed is:

1. A DC grid system in which a storage battery is connected to a DC bus, the DC grid system comprising:
   a first converter configured to convert an alternating current voltage input from an alternating current power system into a first direct current voltage;
   a second converter configured to convert a second direct current voltage input from the storage battery into a third direct current voltage;
   a DC bus that connects the first converter and the second converter; and
   a control unit configured to provide a command value to the first converter and to the second converter, wherein
   the control unit calculates a first voltage command value of the DC bus in the first converter and a second voltage command value of the DC bus in the second converter based on the second direct current voltage, a target voltage of the storage battery, and a voltage of the DC bus, and a voltage ratio between a voltage of the storage battery and the voltage of the DC bus, and
   the control unit controls the voltage of the DC bus in conjunction with the target voltage by providing the first voltage command value as the command value for the first converter and providing the second voltage command value as the command value for the second converter.

2. The DC grid system according to claim 1, wherein
   the control unit receives a value specifying a target state of charge of the storage battery, and
   the control unit calculates the target voltage by converting the target state of charge to an output voltage of the storage battery.

3. The DC grid system according to claim 1, wherein
   the control unit receives a value specifying a ratio of a conduction ratio of the second converter at a time point before the storage battery is charged or discharged with respect to a conduction ratio of the second converter at a time point after the storage battery is charged or discharged, and
   the control unit calculates the first voltage command value and the second voltage command value using the ratio in addition to the second direct current voltage, the target voltage of the storage battery, and the voltage of the DC bus.

4. The DC grid system according to claim 1, wherein
   the control unit provides the first voltage command value and the second voltage command value as the command value for the first converter and the command value for the second converter, respectively, and then recalculates the first voltage command value and the second voltage command value using the second direct current voltage, the target voltage of the storage battery, and the voltage of the DC bus after a predetermined time elapses, and
   the control unit provides the recalculated first voltage command value and the recalculated second voltage command value as the command value for the first converter and the command value for the second converter, respectively.

5. The DC grid system according to claim 1, wherein
   the control unit acquires a current conduction ratio of the second converter, and
   the control unit constrains the first voltage command value and the second voltage command value by setting an upper limit threshold value for a ratio of the acquired current conduction ratio with respect to a conduction ratio of the second converter when a voltage of the storage battery reaches the target voltage.

6. The DC grid system according to claim 1, further comprising:
   a storage unit configured to store data recording a relation among a state of charge of the storage battery, a voltage output from the storage battery, and a temperature of the storage battery, wherein
   the control unit acquires the target voltage of the storage battery by using a target value of the state of charge of the storage battery and the temperature of the storage battery and referring to the data, and
   the control unit calculates the first voltage command value and the second voltage command value using the acquired target voltage.

7. The DC grid system according to claim 6, wherein
   the first voltage command value and the second voltage command value are provided as the command value for the first converter and the command value for the second converter, respectively, and then the target voltage of the storage battery is reacquired by using the target value of the state of charge of the storage battery and the temperature of the storage battery and referring to the data after a predetermined time elapses, and
   the control unit calculates the first voltage command value and the second voltage command value using the reacquired target voltage.

8. A control device for controlling a voltage converter provided in a DC grid system in which a storage battery is connected to a DC bus, the DC grid system including a first converter configured to convert an alternating current voltage input from an alternating current power system into a first direct current voltage, a second converter configured to convert a second direct current voltage input from the storage battery into a third direct current voltage, and a DC bus that connects the first converter and the second converter, the control device comprising:
   a calculation unit configured to provide a command value to the first converter and to the second converter, wherein
   the calculation unit calculates a first voltage command value of the DC bus in the first converter and a second voltage command value of the DC bus in the second converter using the second direct current voltage, a target voltage of the storage battery, and a voltage of the DC bus, and
   the calculation unit controls the voltage of the DC bus in conjunction with the target voltage by providing the first voltage command value as the command value for the first converter and providing the second voltage command value as the command value for the second converter.

9. A control method for controlling a voltage converter provided in a DC grid system in which a storage battery is connected to a DC bus, the DC grid system including a first converter configured to convert an alternating current voltage input from an alternating current power system into a first direct current voltage, a second converter configured to convert a second direct current voltage input from the storage battery into a third direct current voltage, and a DC bus that connects the first converter and the second converter, the control method comprising:
   a step of providing a command value to the first converter and to the second converter, wherein
   in the step of providing the command value, a first voltage command value of the DC bus in the first converter and a second voltage command value of the DC bus in the second converter are calculated based on the second direct current voltage, a target voltage of the storage battery, a voltage of the DC bus, and a voltage ratio between a voltage of the storage battery and the voltage of the DC bus, and
   in the step of providing the command value, the voltage of the DC bus is controlled in conjunction with the target voltage by providing the first voltage command value as the command value for the first converter and providing the second voltage command value as the command value for the second converter.

* * * * *